Feb. 7, 1961      G. BERGSON      2,970,669
CONDENSING FILTER
Filed June 21, 1957      4 Sheets-Sheet 1
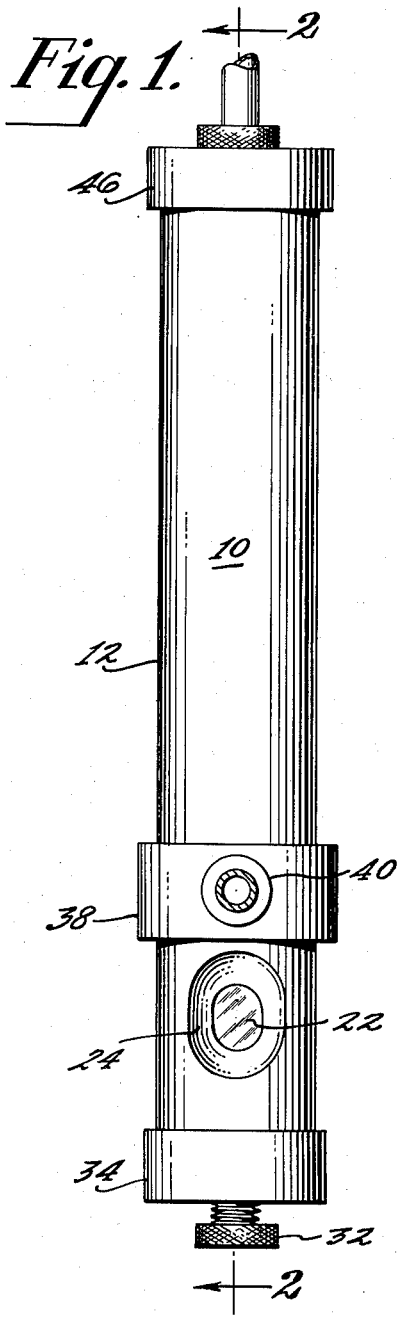
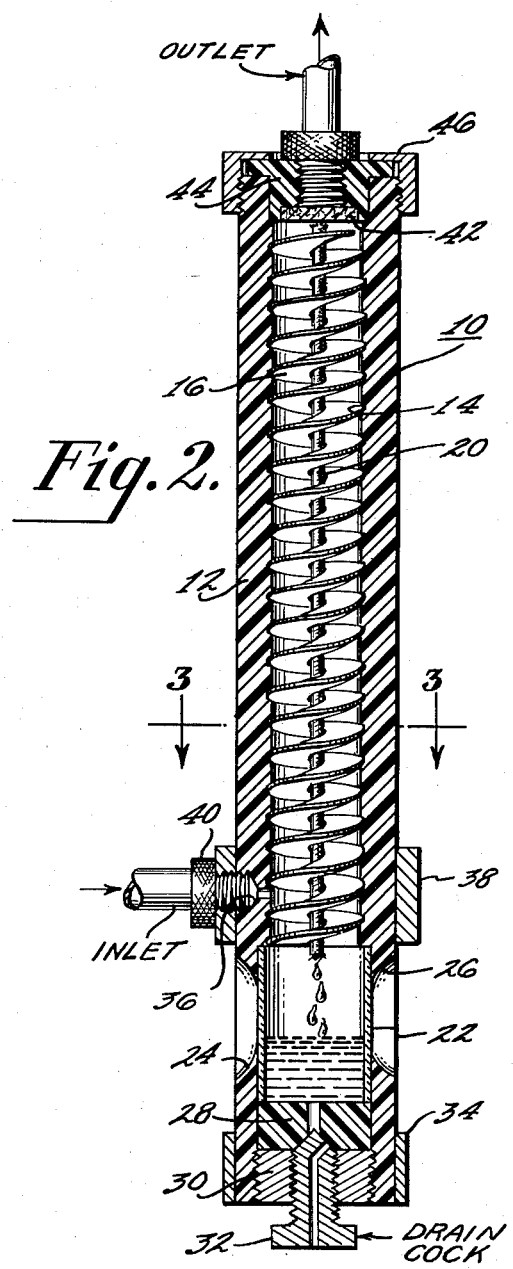
INVENTOR.
*Gustav Bergson*
BY
*Eugene M. Whitacre*
AGENT.

Feb. 7, 1961 G. BERGSON 2,970,669
CONDENSING FILTER
Filed June 21, 1957 4 Sheets-Sheet 2

INVENTOR.
Gustav Bergson
BY Eugene M. Whitacre
AGENT.

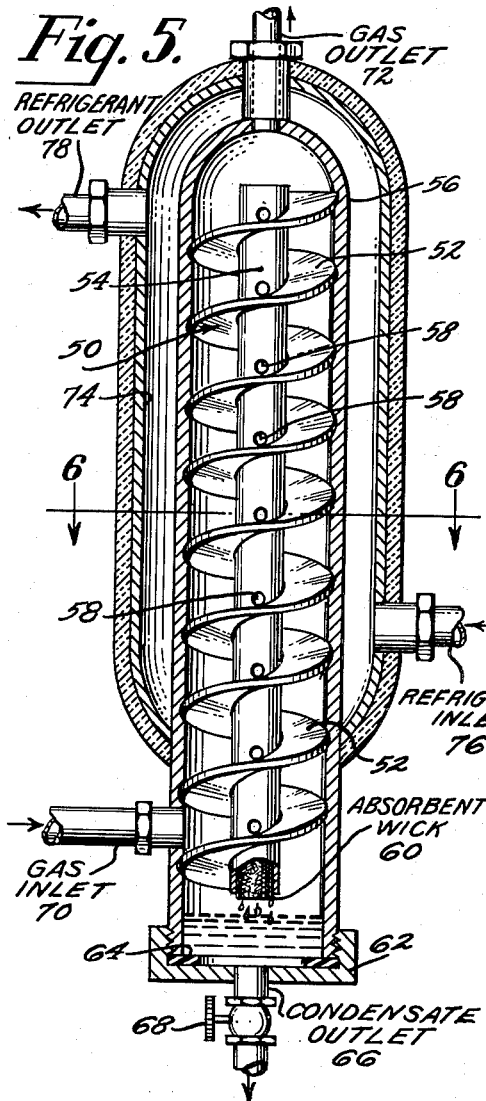
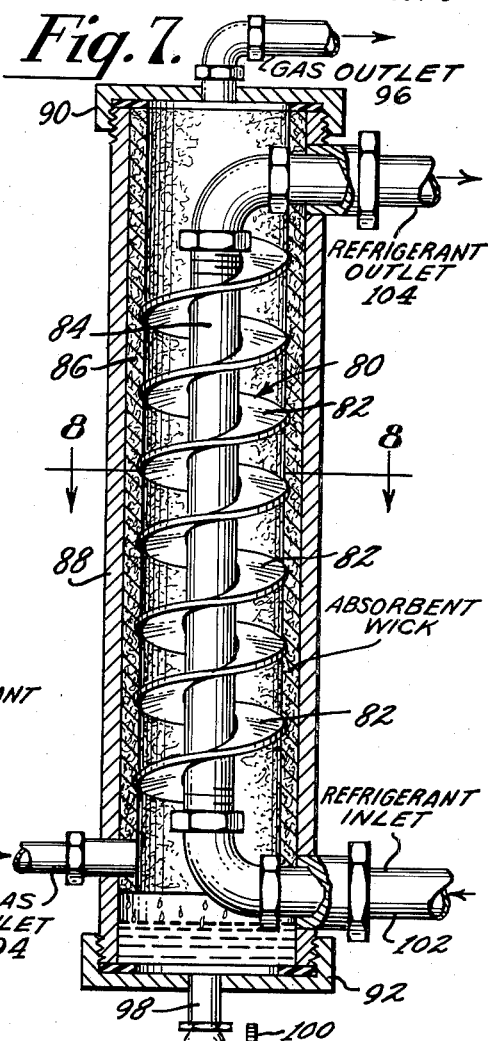
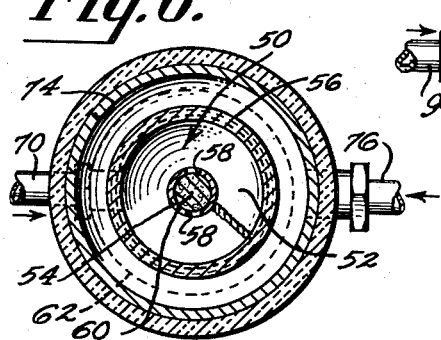
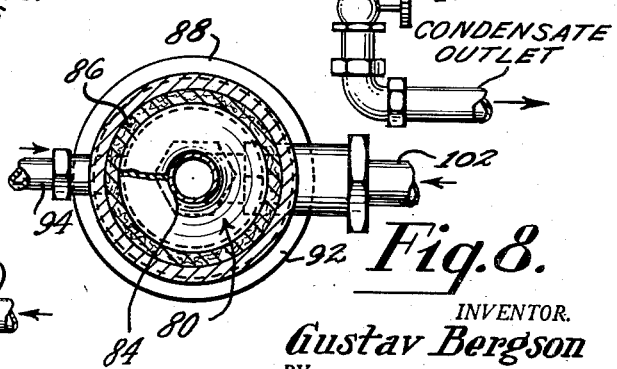
Feb. 7, 1961 — G. BERGSON — 2,970,669
CONDENSING FILTER
Filed June 21, 1957 — 4 Sheets-Sheet 3
INVENTOR.
Gustav Bergson

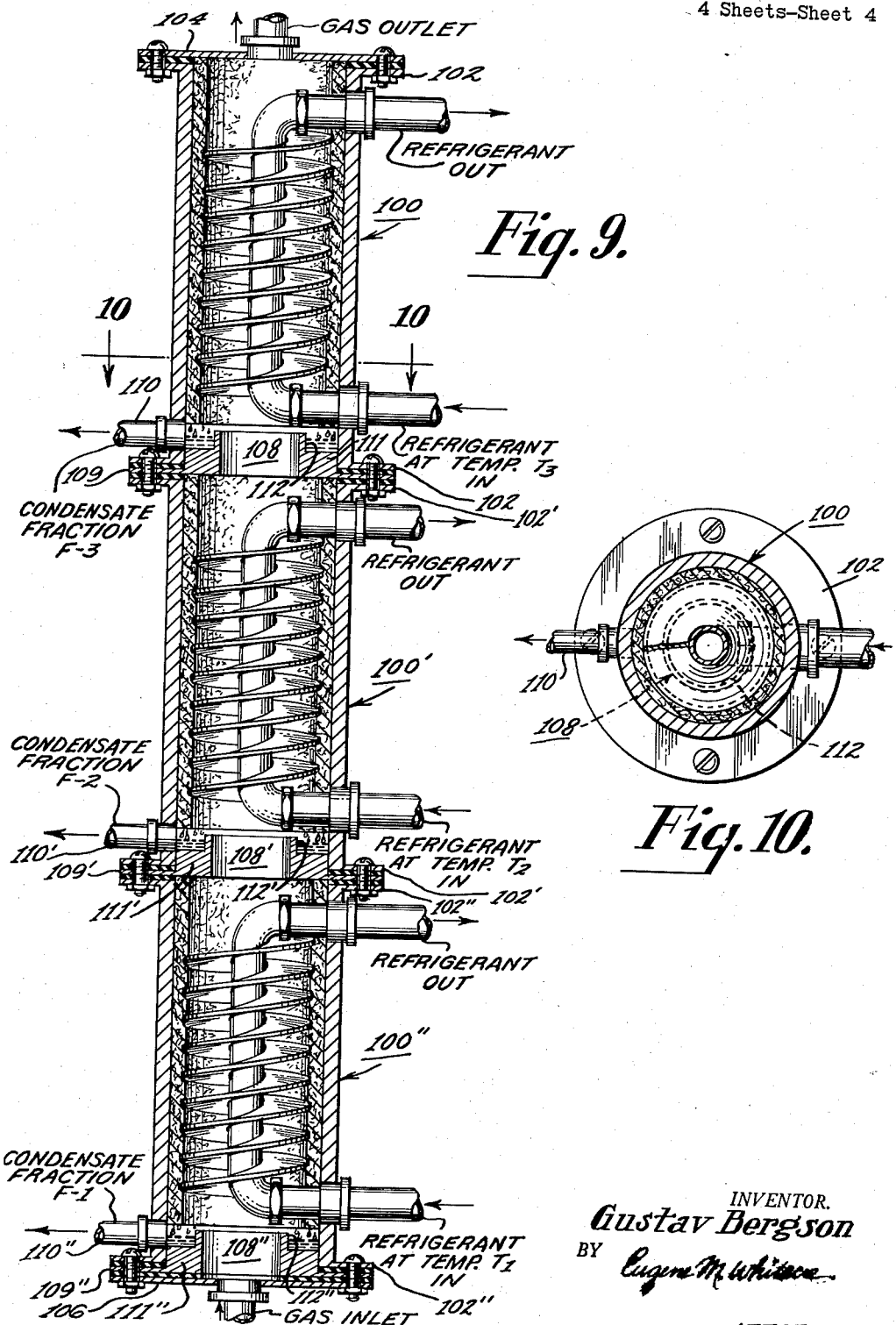

United States Patent Office 2,970,669
Patented Feb. 7, 1961

2,970,669

CONDENSING FILTER

Gustav Bergson, Philadelphia, Pa.
(York Road and Sunset Lane, Hatboro, Pa.)

Filed June 21, 1957, Ser. No. 667,264

12 Claims. (Cl. 183—2)

This invention relates generally to separating devices for separating one or more components of a gas from the remaining portions and more particularly this invention relates to condensers or condensing filters for separating a more condensible fraction of a gas from a less condensible fraction. This application is a continuation in part of my application Serial No. 614,864 entitled "Condensing Filter" filed October 9, 1956, now abandoned.

It is often desirable or necessary in certain industrial applications to separate a more condensible fraction of a gas from the less condensible fractions. This may be accomplished by passing the gas along a surface on which the more condensible fractions condense. A device for accomplishing this function, called a condenser, or a condensing filter, may be provided with a plurality of baffles to increase the path length of the gas, and provide a greater surface area over which the gas must pass for a given size condenser. These condensers are generally arranged so that the condensed fraction drains back through the on-coming gas stream into a suitable receptacle.

One disadvantage of such a condenser is that the gas stream in passing over the condensed fraction tends to pick up and return some of this fraction to the gas stream. This aspect of condensers used heretofore resulted in inefficiency inasmuch as the revaporization of the condensate works against the desired result.

Accordingly, it is an object of the present invention to provide an improved condenser or condensing filter for separating a more condensible fraction of a gas from a less condensible fraction wherein the condensed fraction of the gas does not pass through the on-coming or outgoing gas stream in reaching its ultimate receptacle.

Another object of this invention is to provide an improved condenser wherein condensate formed on the walls of the condenser is quickly and efficiently removed from the condenser surfaces passed by the gas.

A further object of this invention is to provide an improved condensing filter which is small and compact in size, and simple and rugged in construction which is extremely efficient in operation.

A still further object of this invention is to provide an improved condenser which provides a great surface area in a small physical space thereby providing excellent thermal contact with the gas admitted to the condenser and enabling highly efficient heat transfer between the condenser and this gas. The condenser operates to quickly and efficiently remove any condensate from the surfaces of the condenser passed by the gas stream.

The condenser of the invention includes a helical or spiral passageway through which the gas containing the fractions to be separated is passed. To provide an outlet for condensate which forms in the passageway, an opening extending along the passageway is provided into which the condensate may drain and an absorbent wick can be inserted through the opening. As the gas is passed through the spiral passageway, the more condensible fraction thereof condenses on the walls of the passageway and drains toward the wick and is absorbed thereby. The condensed fraction then drains by virtue of its own weight through the wick into a suitable receptacle without being exposed to the gas stream. Since the condensate in the wick is not directly exposed to the gas stream as it drains out of the condenser, very little of the condensate revaporizes. This feature greatly improves the efficiency of separation of the fractions of a gas without extending the size or complexity of the condenser.

The novel features that are considered characteristic of this invention are set forth with particularity in the appended claims. The invention itself, however, both as to its organization and method of operation, as well as additional objects and advantages, thereof, will best be understood from the following description when read in connection with the accompanying drawing, in which:

Figure 1 is an elevational view of a condenser constructed in accordance with the invention;

Figure 2 is a sectional view of the condenser of Figure 1 taken on the section lines 2—2;

Figure 5 is a side elevational sectional view of a modification of the condenser shown in Figure 1;

Figure 6 is a sectional view of the condenser shown in Figure 5 taken on the section lines 6—6;

Figure 7 is a side elevational sectional view of a still further modification of the condenser of the invention;

Figure 8 is a sectional view of the condenser shown in Figure 7 taken on section lines 8—8; and Figures 9 and 10 are side elevational (partly broken away) and sectional views respectively of a further modification of the invention.

Figure 3:
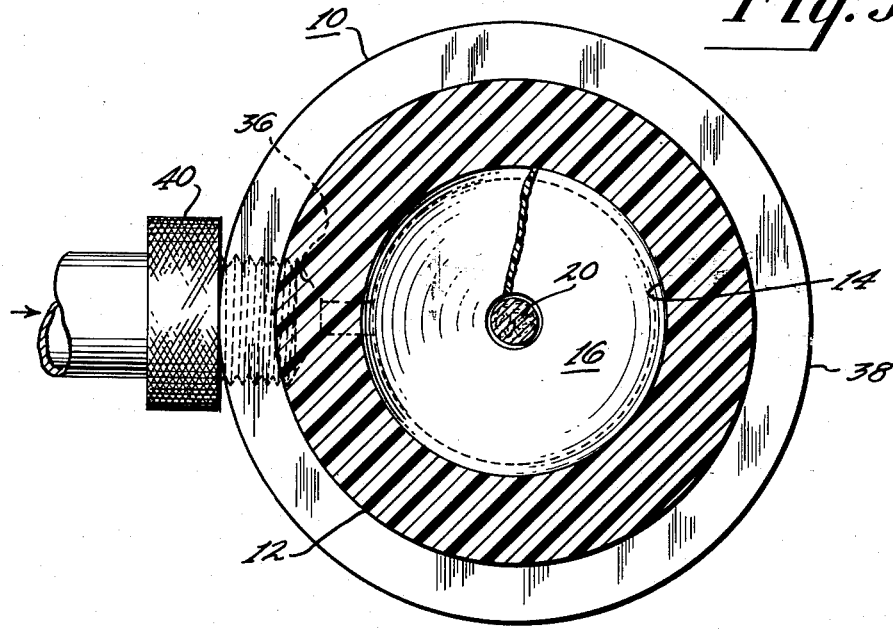
Figure 3 is an enlarged sectional view of the condenser shown in Figure 1 taken on the section lines 3—3.
Figure 4:
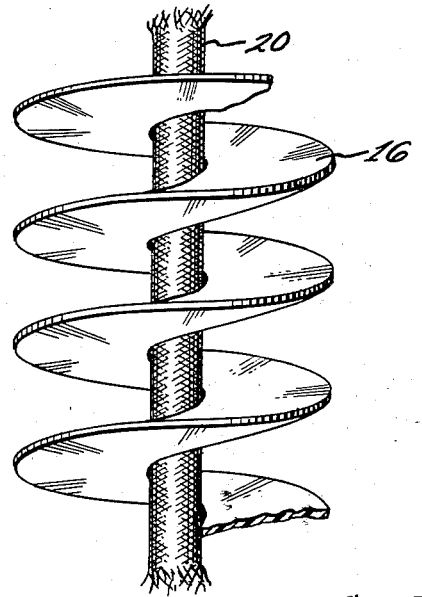
Figure 4 is an enlarged side view of the spiral element which together with the tubular housing forms a spiral passageway.

Referring now to the drawings wherein like reference numerals will be used in designating similar components throughout, the condenser 10 is provided with a tubular body portion 12 which has a spiral or helical groove 14 extending along the inner surface thereof. A continuous spiral member 16 which is best shown in Figure 4, having a central opening 18 extending axially thereof as shown in Figure 3, is threaded into the spiral groove 14 in the tubular body portion to form a spiral passageway. The spiral member 16 is preferably formed of a resilient material to facilitate construction and assembly, but if desired, may be formed of a rigid material such as stainless steel. In the embodiment illustrated it was found to be convenient to cut the spiral member 16 in a cutting or shaving operation on a lathe from a rod of Teflon stock. The spiral member is cut so that the surface facing in the direction of the top of the condenser is dish-shaped, or sloped toward the central opening 18.

An absorbent wick 20 which may be of Teflon felt is inserted through the central opening 18 in engagement with the inner peripheral edge of the continuous spiral member 16, and extends generally along the axis of the tubular housing 12. The purpose of the wick is to absorb the fractions of a gas which drain to it after condensing on the walls of the spiral passageway formed by the continuous spiral member 16 and the tubular housing 12. The condensed fraction thus drains downwardly, in the wick, by virtue of its own weight to a receptacle formed by a cylindrical sight glass 22 which fits snugly inside the bottom end of the tubular housing 12. Portions 24 and 26 of the housing 12 adjacent the sight glass 22 are cut away so that a visual indication may be had of the amount of condensate collected in the receptacle formed by the sight glass 22.

A plug 28 having a central aperture fits snugly against the bottom side of the sight glass 22 to form the bottom side of the receptacle for the condensate. The plug 28 is held in position by a threaded retaining bolt 30 which is screwed into the bottom end of the tubular housing 12. The retaining bolt 30 has a tapped central opening for receiving a threaded drain cock 32. The drain cock 32 is provided with a passageway which is adapted to be in registry with a portion of the plug 28 when the drain cock is turned all the way in. This prevents the condensate from escaping from the receptacle and after a small amount of condensate has drained into the receptacle a liquid seal is provided which prevents undesired gases from entering the condenser. When the drain cock is turned so that the upper end thereof is backed off the plug 28, the condensate can escape from the receptacle through the central aperture in the plug 28 and the passageway in the drain cock 32.

A steel band 34 may be provided around the outside of the tubular housing 12 if necessary, to prevent splitting of the housing due to the forces set up when the retaining bolt 30 is screwed into place.

A threaded gas inlet opening 36 is bored in the side of the tubular housing 12 near the bottom thereof but above the receptacle for the condensate. In the present embodiment the housing 12 was made of Teflon which cannot be subjected to the stresses exerted by a pipe fitting affixed directly thereto without splitting. To overcome this problem, a metal band 38 having a threaded aperture 40 is provided around the housing so that the aperture 40 is in registry with the opening 36.

The outlet side of the condenser of the invention includes a Teflon felt filter 42 which is held in place by a flanged plug 44. The plug 44 which has a threaded central aperture for receiving an outlet pipe line is held in place by a nut 46 which screws on to the top end of the tubular housing 12.

As noted above in many industrial applications, it is desirable to separate a non-condensible fraction of a gas from a condensible fraction or in the case of a fractionable distillation system to separate a more condensible fraction of a gas from a less condensible fraction. For example, in the manufacture of refrigerating systems it is necessary to minimize the quantity of water or water vapor present in the refrigerant gas. Extremely sensitive instruments for detecting the presence of this water vapor have been used. These instruments include delicate water absorbing elements which may become fouled with oil from the compressor for the refrigerating system unless the oil is removed.

A condenser in accordance with the invention provides a simple and very efficient way of removing the vaporized oil from the remainder of the gas in the system. In operation the refrigerant gas passes into the inlet side of the condenser 10 through the opening 36 under its own pressure and circulates spirally through the passageway formed by the continuous spiral member 16 and the tubular housing 12 toward the top of the condenser. This spiral passageway provides in relatively short longitudinal length a great surface area over which the gas must pass. Upon contact with this surface area which may, if desired, be maintained at a desired temperature by cooling or heating coils or the like, the oil condensers on the surfaces and drains toward the absorbent wick 20. This drainage action is enhanced by the configuration of the surfaces of the continuous spiral member 16, which slope downwardly toward the central opening 18. This feature insures that the condensate reaches the wick quickly after condensing thereby further improving the efficiency of the condenser. The Teflon construction of the continuous spiral member 16 and the tubular housing 12 wets easily with oil whereby the oil flows freely toward the wick 26. It does not wet with water which may be present so the quantity to be measured is not disturbed.

The wick 26 readily absorbs the oil which then flows downwardly through the wick by force of gravity to the receptacle, formed by the sight glass 22 and the plug 28. It is important to note that the oil does not flow back through the gas stream in a manner that the condensed oil will be again picked up in substantial quantities by the gas stream.

Upon reaching the upper end of the condenser 10 the gas then flows through a Teflon felt filter into the outlet pipe line, not shown, which may be connected to the sensitive water measurement instrument described above which is used in connection with the manufacture of refrigerating systems. It was found that a 4½" longitudinal length of spiral passageway in accordance with the invention provided an extremely efficient filter which removed almost all the more condensible fraction from the gas stream. In the case of oil being removed from the refrigerant, the oil was removed down to minute traces which did not disturb the water measuring instrument.

The condenser shown in the drawings is also operable without the wick 20, however, this manner of operation is not as efficient as when the wick is used. The spiral passageway imparts a spin to the gas stream wherein a considerable surface area is contacted by the stream before leaving the condenser. The condensate formed on the surfaces of the condenser then merely falls through the central opening 18 into the receptacle described above.

Referring to the modification of the invention shown in Figures 5 and 6, the condenser has a member 50 in the nature of a screw, with a helical thread 52 and a hollow control portion 54. The member 50 may be fabricated as an integral structure to facilitate the manufacture thereof by suitable machining from stock material or the like. A cylindrical casing 56 surrounds the member 50 so that the peripheral edges of the helical thread 52 are in substantially air tight contact therewith to form a spiral passageway through which a gas or vapor to be condensed may be passed. The upper surface of the helical thread 52 is dish shaped, or in other words, sloped inwardly so that condensate forming in the spiral passageway tends to drain toward the central portion 54.

A plurality of apertures 58 are provided in the central portion 54 of the member 50 adjacent the junction of the helical thread 52 with the central portion 54 so that condensate may flow directly out of the spiral passageway without further exposure to the gas stream. To facilitate the removal of condensate out of the spiral passageway and to impede the flow of the gas through the apertures 58, an absorbent wick 60 is inserted in the central bore of the central portion 54. As mentioned above in connection with Figures 1-4 the purpose of the wick 60 is to absorb the condensate formed on the walls of the spiral passageway and convey the condensate to a suitable receptacle without further exposure to the gas stream. As illustrated in Figure 5, the condensate is drained to the bottom portion of the casing 56 which is closed by the cap 62 and a suitable gasket 64. The condensate may be drained from the condenser through the drain pipe 66. A valve 68 in the drain pipe 66 controls the flow of the condensate.

The gas or vapor to be condensed is admitted to the condenser through an inlet pipe 70 located near the bottom of the casing 56. After traversing the spiral passageway, the uncondensed portions of the gas pass out through the dome shaped upper end of the casing 56 to an outlet pipe 72. It should be understood that the specific structural configurations shown and described herein are for the purpose of illustrations, and other structural forms of the various elements may be used without departing from the scope of the invention.

As is well known, when a gas or vapor changes from the gaseous state to a liquid, a latent heat of vaporation characteristic of the particular substance being condensed is released. Depending on the particular use of the condenser, that is, depending how much heat is to be released which is a function of the latent heat of vaporization and the quantity of the gas being condensed, it may be necessary to cool the condenser to maintain efficient operation thereof. To this end a refrigerating jacket 74 enclosed at least a portion of the casing 56. The jacket 74 is insulated by layer of asbestos or the like to confine the heat transfer between the refrigerant and the gas in the spiral passageway. A refrigerant, that is a gas or liquid of lower temperature than the gas or vapor to be condensed, is admitted to the space between the jacket 74 and the casing 56 through a refrigerant inlet pipe 76 located near the bottom end of the jacket 74, and is exhausted through an outlet pipe 78. Although the materials of which the condenser is constructed are not critical, in applications requiring a substantial heat transfer, it is desirable to fabricate the member 50 and the casing 56 of a good conductor of heat such as metal to enable efficient heat transfer between the gas or vapor to be condensed and the refrigerant.

In the modification of the invention shown in Figures 7 and 8 the condenser has a screw like member 80 with a helical thread 82 and a hollow central bore 84. The absorbent wick 86 position is different from that previously described in that the wick is in engagement with the peripheral edges of the helical thread 82. The upper surface of the helical thread is convex or slopes outwardly so that condensate forming in the passageway drains toward the wick 86. The assembly including the wick 86 and member 80 are enclosed in a casing 88 which is provided with top and bottom caps 90 and 92 respectively. The gas or vapor to be condensed is admitted to the condenser through an inlet pipe 94 which is located near the bottom of the casing 88, and uncondensed portions of the admitted gas leave the condenser through an outlet pipe 96 which is shown as passing through the top cap 90. Condensate forming in the spiral passageway flows substantially directly to the absorbent wick 86, and is drained by force of gravity to the bottom of the casing 88. The condensate may be drained from the condenser through a drain pipe 98 in the bottom cap 92, the flow being controlled by a valve 100 in the drain pipe 98.

The large amount of surface area of the wick 86 brought into intimate contact with the gas stream in passing through the spiral passageway may be used advantageously to separate selectively certain components of the gas. For example, the wick 86 may be dipped in activated carbon or some other material which has the characteristic of selectively absorbing certain gases before being assembled in the casing 88. The separation of certain components of the gas stream into the activated wick may be effected in addition or simultaneously with a desired condensing action of condensible fractions carried by the gas, or if so desired the selective absorption by the wick may be independent of condensing action.

If the heat exchange requirements demand, a suitable coolant may be passed through the central bore 84 of the member 80. To this end inlet and outlet pipes 102 and 104 are provided in the lower and upper ends of the casing 88 respectively.

Figures 9 and 10 illustrate a still further modification of the invention wherein a plurality of separate condensing filter units are connected in a cascade arrangement to form, for example, a fractional distillation system. The individual condensing filter units 100, 100' and 100'' are similar in configuration to the structure shown and described in connection with Figures 7 and 8 with the exceptions to be hereinafter described.

Each of the condensing filter units 100, 100' and 100'' are provided with annular flanges 102, 102' and 102'' respectively on either end thereof to provide a convenient means for mechanically coupling the units together, or to the inlet and outlet pipe fittings 104 and 106.

In addition to the flanges condensate receptacle fittings 108, 108' and 108'' are provided for each of the condensing filters. The condensate receptacle fittings 108, 108' and 108'' each have a flange 109, 109' and 109'' and hub portions 111, 111' and 111'' which are adapted to be snugly received into the lower end of the casing of the respective condensing filter units. The hub portions 111, 111' and 111'' have an axial opening so that a gas containing condensible fractions may freely flow into the lower end of each of the condensing units. Annular rim members 112, 112' and 112'' are provided on the respective hub portions 111, 111' and 111'' so that a trough is formed which is disposed directly beneath the absorbent wick means to receive the condensate which drains therefrom. Condensate outlet pipes 110, 110' and 110'' are provided through the casings of the respective condensing filter units 100, 100' and 100'' to drain the condensate from the troughs.

In coupling the condensing filter units 100, 100' and 100'' together, gaskets are provided between the flanges of the filter units and the flanges of the condensate fittings and inlet and outlet pipe fittings to provide an air tight seal. These flanges may then be tightly secured together by suitable fastening means such as bolts passing through aligned apertures in the respective flanges.

In the operation of the system a gas containing condensible fractions $F_1$, $F_2$ and $F_3$ which respectively condense at temperatures $T_1$, $T_2$ and $T_3$ is admitted to the system through the gas inlet pipe fitting 106. During the traversal of the spiral passageway within the condensing filter unit 100'' the gas is in intimate contact with the walls thereof which are comprised of a material exhibiting good heat conducting characteristics. Thus the gas assumes the temperature of the walls of the spiral passageway. This temperature is controlled by the temperature $T_1$ of the coolant which passes through the hollow control base extending along the axis of the condensing filter 100''. Thus the fraction of the gas $F_1$, the dew point of which is at the temperature $T_1$ condenses on the walls of the spiral passageway, and drain toward the absorbent wick, and ultimately to the condensate receptacle 108''.

As mentioned hereinbefore, the construction of the condensing filter of the invention provides a large amount of surface area in a relatively compact unit thereby enabling a highly efficient condensing action which is further enhanced by the removal of the condensate from the gas stream by the absorbent wick means. After leaving the condensing filter 100'' the gas passes along the axis thereof directly into the condensing filter 100'.

In like manner, the condensing filter units 100' and 100 are maintained at temperatures $T_2$ and $T_3$ respectively, by the respective coolants, and the fractions of the gas $F_2$ and $F_3$ condensed out as the gas sequentially passes through these units.

It is to be understood that the mechanical design and scale of the condensing filter units shown and described may be varied without departing from the scope of the invention. Furthermore, the use of the cascaded condensing filter units as a fraction distillation system is not to be construed as limiting since other applications will suggest themselves to persons skilled in the art.

The condenser or condensing filter provided in accordance with the invention described above is small and compact in size and simple and rugged in construction and also provides extremely efficient operation in use.

What is claimed is:

1. A condensing filter for separating more condensible fractions of a gas stream from less condensible fractions of said stream comprising a tubular housing having a helical groove in the inner surface thereof, a continuous spiral member having an axial opening threaded in said groove to provide a spiral passageway extending along the length of said housing, the surface of said spiral member facing the upper end of said tubular body being sloped downwardly toward said opening so that condensate forming thereon drains toward said opening, absorbent wick means in said opening for absorbing more condensible fractions of said gas condensed in said passageway, means providing a receptacle at the lower end of said tubular housing for receiving condensate draining through said wick, means providing a gas stream inlet opening in said housing near one end thereof, and means providing a gas stream outlet opening in said housing near the other end thereof.

2. A condenser for separating a more condensible fraction of a gas from a less condensible fraction comprising in combination a tubular housing enclosing a helical passageway extending longitudinally in said housing, an inlet opening for a gas stream at one end of the housing and an outlet opening for the gas stream at the other end of the housing whereby gas admitted into said housing through said inlet opening follows said helical passageway to said outlet opening, means providing an opening along said passageway extending along the axis of said tubular housing, the surface of said passageway adapted to face upwardly being sloped downwardly toward said opening whereby condensate forming in said passageway drains toward said opening, a wick extending through at least a portion of the latter opening for receiving condensate draining from the passageway, whereby said condensate may be drained from said condenser without further passing through said passageway.

3. A condenser as defined in claim 2 including a receptacle for receiving condensate positioned adjacent the end of said wick which is adapted to extend downwardly.

4. A condensing filter for separating more condensible fractions of a gas stream from less condensible fractions of said stream comprising a tubular housing enclosing a spiral passageway extending along the length of said housing, means providing an opening extending axially through said passageway and said housing, wick means extending through said opening for receiving the condensed portion of said more condensible fractions of said gas, means providing an inlet opening for a gas near one end of said tubular housing, and means providing an outlet opening for said gas near the other end of said housing.

5. A condenser comprising a tubular housing enclosing a spiral passageway extending along the length of said housing, means providing an opening extending axially through said passageway and said housing, wick means extending through said opening, means providing an inlet opening for a gas near one end of said tubular housing, and means providing an outlet opening for said gas near the other end of said housing.

6. A condenser comprising a casing member, a second member the outside dimension of which is smaller than the inside dimension of said casing member positioned in coaxial relation within said casing member, means providing a helical member extending between said casing member and second member to form a helical passageway, means providing an outlet port for condensate near one end of said helical passageway, one of said casing and second members comprising wick means for absorbing condensate formed in said passageway and for draining said condensate to said outlet port means in a path bypassing said passageway, the upper surface of said helical member being sloped downwardly toward the member comprising said wick means whereby condensate forming in said passageway drains toward said wick means, means providing an inlet opening for a gas to be condensed near one end of said casing and means providing an outlet opening for said gas near the other end of said casing.

7. A condenser comprising a casing member, a second member the outside dimension of which is smaller than the inside dimension of said casing member positioned in coaxial relation within said casing member, means providing a helical member extending between said casing member and said second member to form a helical passageway, means providing an outlet port for condensate near one end of said helical passageway, said second member being hollow and including wick means positioned therein for absorbing condensate formed in said passageway, and for draining said condensate to said outlet port means in a path bypassing said passageway, means defining a plurality of apertures in said second member adjacent the junction of the surface of said helical member and said second portion through which condensate formed in said passageway flows to said wick member, the upper surface of said helical member being sloped downwardly toward the second member whereby condensate formed in said passageway drains toward said second member, means providing an inlet opening for a gas to be condensed near one end of said casing and means providing an outlet opening for said gas near the other end of said casing.

8. A condenser comprising a casing member, a second member the outside dimension of which is smaller than the inside dimension of said casing member positioned in coaxial relation within said casing member, means providing a helical member extending between said casing member and said second member to form a helical passageway, means providing an outlet port for condensate near one end of said helical passageway, said casing member including an inner lining comprising wick means for absorbing condensate formed in said passageway and for draining said condensate to said outlet port means in a path bypassing said passageway, the upper surface of said helical member being sloped downwardly toward said casing member whereby condensate formed in said passageway drains toward said casing member, mean providing an inlet opening for a gas to be condensed near one end of said casing and means providing an outlet opening for said gas near the other end of said casing.

9. A condenser comprising a casing member, a second hollow member the outside dimension of which is smaller than the inside dimension of said casing member positioned in coaxial relation within said casing member, means providing a helical member extending between said casing member and said second member to form a helical passageway, means providing an outlet port for condensate near one end of said helical passageway, said casing member including an inner lining comprising wick means for absorbing condensate formed in said passageway and for draining said condensate to said outlet port means in a path bypassing said passageway, the upper surface of said helical member being sloped downwardly toward said casing member whereby condensate formed in said passageway drains toward said casing member, means providing an inlet opening for a gas to be condensed near one end of said casing and means providing an outlet opening for said gas near the other end of said casing, and inlet and outlet connections to said hollow central portion to form a passageway for a coolant to cool the gas in said spiral passageway.

10. An article of manufacture comprising a tubular casing, means providing a generally helical surface positioned within said casing having the outer peripheral edge thereof in engagement with the inner wall of said tubular casing, said helical surface means having an opening therein extending generally through the axis thereof, absorbent wick means positioned in said opening of said helical surface means, said casing, said helical surface means and said wick means defining a spiral passageway, means providing an inlet to said passageway near one end of said casing and means providing an outlet from said passageway near the other end of said passageway.

11. An article of manufacture comprising a tubular casing, means providing a generally helical surface positioned within said casing having an outer peripheral edge thereof in engagement with the inner wall of said tubular casing, absorbent wick means positioned generally along the axis of said helical surface means, said casing, said helical surface means and said wick means defining a spiral passageway, said helical surface means being sloped toward said wick means, means providing an inlet to said passageway near one end of said casing and means providing an outlet from said passageway near the other end of said passageway.

12. A condensing filter for separating more condensible fractions of a gas stream from less condensible fractions of said stream comprising, means providing a member defining a spiral surface, means providing first and second wall members located with respect to said member defining a spiral surface to form an elongated spiral passageway, condensate outlet means for receiving condensate formed in said passageway, at least one of said first and second wall chambers comprising absorbent wick means for absorbing condensate formed in said passageway and draining said condensate by force of gravity directly to said condensate outlet means in a path which is shorter than the length of said passageway to minimize the exposure of said gas to condensate, said spiral surface being inclined toward said absorbent wick means so that condensate forming on said spiral surface drains toward said wick means, means providing an inlet port for a gas near one end of said passageway, and means providing an outlet port for said gas near the other end of said passageway.

References Cited in the file of this patent
UNITED STATES PATENTS

| | | |
|---|---|---|
| 274,176 | Copeland | Mar. 20, 1883 |
| 357,934 | Ludlow | Feb. 15, 1887 |
| 2,317,101 | Lecky | Apr. 20, 1943 |
| 2,585,385 | Haller | Feb. 12, 1952 |